United States Patent
Huth

[15] 3,645,756
[45] Feb. 29, 1972

[54] FLAVORING MATERIAL PREPARED FROM ONIONS

[72] Inventor: Heinz Huth, Wiesenweg 33a, 345 Holzminden, Germany

[22] Filed: Aug. 15, 1969

[21] Appl. No.: 850,646

[30] Foreign Application Priority Data

Aug. 16, 1968 Austria ..................... A 8011/68

[52] U.S. Cl. ........................... 99/140 R, 99/205
[51] Int. Cl. ........................... A23l 1/22, A23l 1/02
[58] Field of Search ........................ 99/140, 205

[56] References Cited

UNITED STATES PATENTS 3,424,592  1/1969  Huth ........................... 99/140
2,724,652  11/1955  Brent et al. ........................... 99/205

OTHER PUBLICATIONS

Jacobs, " Chemistry & Technology of Food and Food Products," Volume III, Interscience Publishers, Inc. New York (1951) pp. 2193–2195.

*Primary Examiner*—Morris O. Wolk
*Assistant Examiner*—Warren Bovee
*Attorney*—Browdy and Neimark

[57] ABSTRACT

Flavoring material is prepared from onions by expressing their juice, flash heating, cooling and concentration. Condensate from the vapor evolved during concentration can be extracted and used as well.

4 Claims, No Drawings

FLAVORING MATERIAL PREPARED FROM ONIONS

The present invention relates to methods for the production of a concentrated practically sterile raw onion aroma which can be kept at room temperature (20° C.) without the addition of preserving agents.

For the flavoring of food materials in the kitchen and industrial production dry onions are used in addition to raw onions, there being various different degrees of comminution. The disadvantages of the working of raw onions are sufficiently known, that is to say ready perishability and therefore only short storage life, difficult and troublesome preparation, the risk of different aroma concentration, the impossibility of obtaining raw material of even quality throughout the year, the bulkiness, and more particularly the high shoot or germ content.

Some of the above-described disadvantages of raw onions can admittedly be overcome by the use of dry onion products such as onion powder or chopped onions, but these dry onion products have, as is known, a high shoot content. Furthermore, in drying, substantial amounts of aroma materials are lost. The differences in the aroma concentration in the different parts can be substantial. Furthermore, an even incorporation during food production is difficult.

In order to flavor food, use is not only made of raw and dried onions but also essences which in substance consist of the etheral oil from onions which is diluted with solvents or mixed with carrying materials. These essences have, however, the disadvantage that both in cold working and also more especially in cooking processes they do not create the flavor in food which is obtained by the use of raw or dried onions.

By the method described in what follows products are obtained which avoid the defects mentioned. The products are substantially sterile and when used for aromatizing food give flavoring effects very similar to those obtained with raw and dry onions. They thus make possible more particularly the production of so-called instant foods which must meet high bacteriological requirements.

One object of the present invention is to provide a product which avoids the above-mentioned disadvantages.

A further object of the invention is to provide onion flavoring materials which are substantially sterile and used for flavoring food give effects very similar to those obtained with raw and dry onions.

A further object of the invention is to provide an onion flavoring product which is suitable for the production of so-called instant meals which must meet high bacteriological requirements.

The present invention consists of a method for producing a flavoring material from onions, comprising expressing juice from onions, heating the juice abruptly to about 140° to about 160° C. immediately after expressing, cooling within seconds to about 40° C., and vacuum evaporating the juice to at least 72 percent dry matter.

The sterile juice so obtained is very light in color and after heating does not substantially change its raw character. For the heating, continuously operating superheating vessels are suitable which heat the juice abruptly from room temperature (20° C.) to the heating temperature and within seconds cool it again to about 40° to 60° C. It has further been found, surprisingly, that the concentration of aroma materials which are effective for flavoring is increased substantially above the level of the starting product. The sterilized juice has been shown by tasting of a solution of about 1 to 2 percent of the juice in water containing cooking salt to have a very much stronger aroma intensity and greater flavoring body than the raw juice. The juice heated in the described dilution also has no bitter taste as has been noted in the case of unheated onion juice and comminuted onions after standing for a long time. If the sterile juice is then evaporated to a dry matter content of at least 72 percent in film evaporators under vacuum at low temperature, it can be held in this form without the addition of preserving materials.

Evaporators which have been found to be suitable for the concentration of the onion juice are those as usually used for the concentration of fruit juices and which operate with a short period of time of the material in the evaporator. The temperature range for the liquid during evaporation is approximately +18° to approximately +40° C., corresponding to vacuums 15 to 55 torr.

Owing to the microbiological stability the onion juice should be condensed to a dry matter content of at least 72 percent. It can, however, be produced with a dry matter content of 80 to 83 percent without substantial loss in quality. This range is the limit for the flow of the product at room temperature.

In concentration of the juice vapors with a high flavoring power are evolved until a high dry matter content of the onion juice is obtained. In order to make use of the vapors it is therefore necessary to catch the whole condensate from the vapors and to extract it with suitable solvents. A solvent which has been found particularly suitable is pure benzene, though besides benzene all materials come into consideration which are not very soluble in water, are stable, have a density which is considerably different from that of water and possess a low boiling point. Suitable are for example low boiling point hydrocarbons, such as pentane and petroleum ether, halocarbons, such as methylene chloride and monofluorotrichloromethane. After distilling off the solvent a very aromatic onion aroma concentrate is obtained which has excellent flavoring properties. This aroma concentrate can be added to the onion concentrate in a given proportion in order to standardize the flavoring power. The product which is obtained in the described manner by the combination of onion juice concentrate and extracted aroma is found to have an excellent taste when examined in 0.1 to 0.2 percent dilution in water containing cooking salt. It can be kept without the addition of preserving materials and its aroma remains stable for periods of months at room temperature.

Example

One thousand kilograms of fresh onions were skinned, comminuted in a perforated disc mill and juice was removed from the mass produced in a fruit press. Seven hundred thirty-five kilograms of onion juice was produced. The juice was passed through a continuous clarifying centrifuge in which the coarse pulp parts were separated off. Then the juice was heated continuously in a superheating cooking device by the injection of steam for fractions of a second up to a temperature of 145° C. and directly after this cooled back down to 40° C. and then pumped into a film evaporator. The juice was condensed to 78 percent dry matter with a vapor temperature above the liquid of 35° C. under a vacuum of 42 torr. One hundred twenty kilograms of onion juice concentrate were produced. The vapors produced were cooled by means of a surface condenser cooled with water at +10° C. The 615 kg. of aroma-containing condensate produced were continuously extracted in a mixing and separating centrifuge with 150 liters of benzene. The benzene was distilled off at normal pressure from the aroma solution down to 10 liters, and following this the benzene was distilled off under vacuum from the flavoring substances. The yield of volatile flavoring substances was 62 g. and subsequently they were returned to the 120 kg. onion juice concentrate. The result was fully aromatic raw onion essence.

Although the aroma concentrate is obtained in different quantities with individual charges, by holding constant the addition of onion juice concentrate a standardized raw onion aroma can be obtained.

I claim:

1. A method for producing an enhanced flavoring material from onions, comprising expressing juice from onions, heating the juice abruptly to about 140° to about 160° C. immediately after expressing, quickly cooling within seconds of said heating to about 40° C., and vacuum evaporating the juice to at least 72 percent solids.

2. A method in accordance with claim 1, in which vapors produced during the vacuum distillation are condensed and extracted to recover flavoring materials from the condensate.

3. A method in accordance with claim 2, in which the extraction takes place with a liquid in two phases.

4. A method in accordance with claim 2, in which material recovered from the vapors is added to the residue material left after vacuum evaporation.

* * * * *